Dec. 24, 1935.  C. SEAMAN  2,025,531
METHOD AND APPARATUS FOR MAKING BLIND STITCHED FACING
Filed July 17, 1935  4 Sheets-Sheet 1
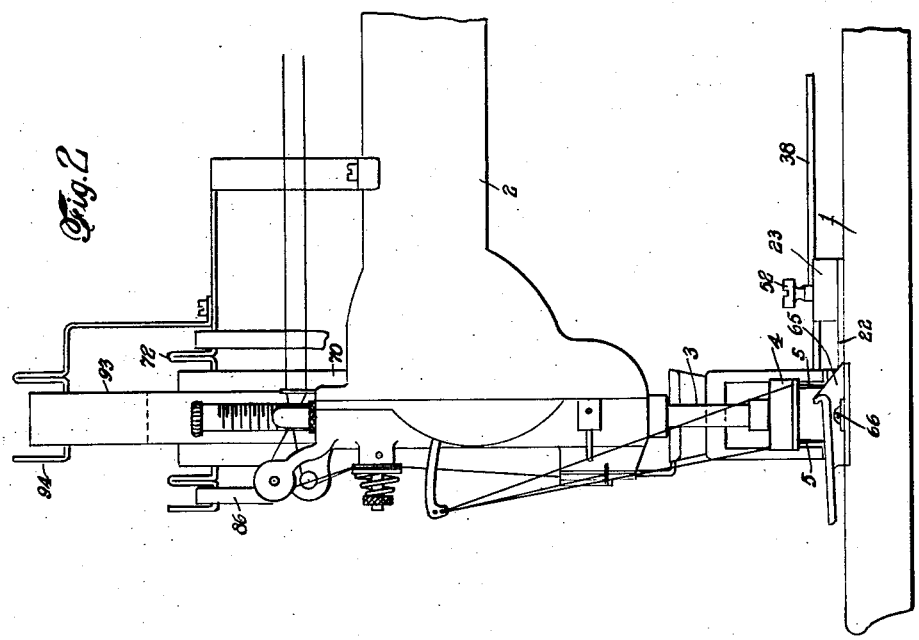
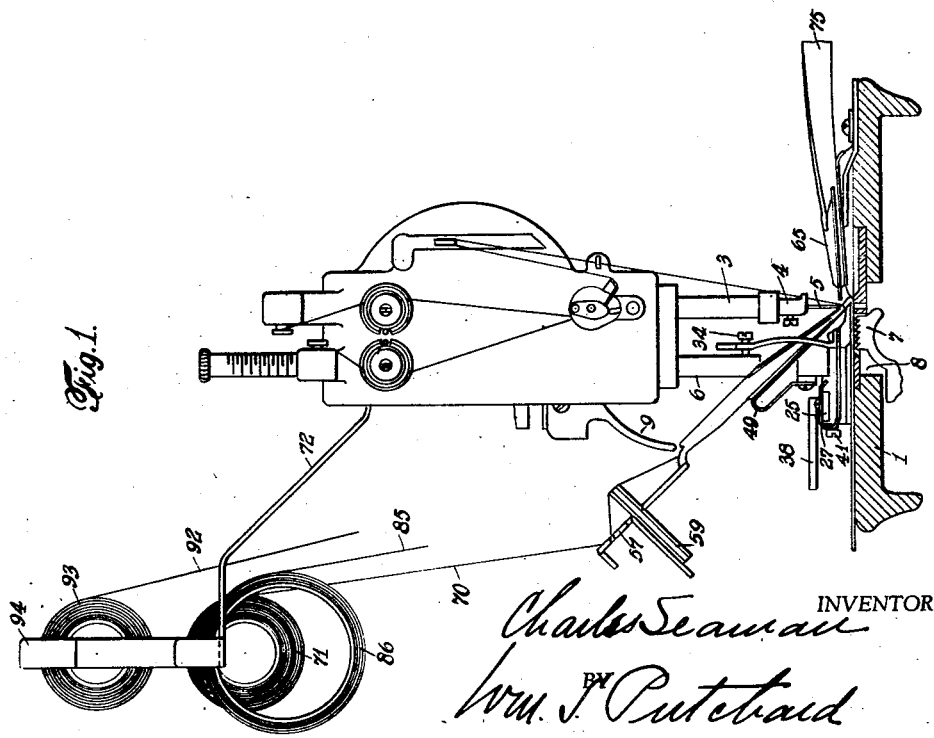
INVENTOR.
Charles Seaman
BY Wm. J. Pritchard
ATTORNEY.

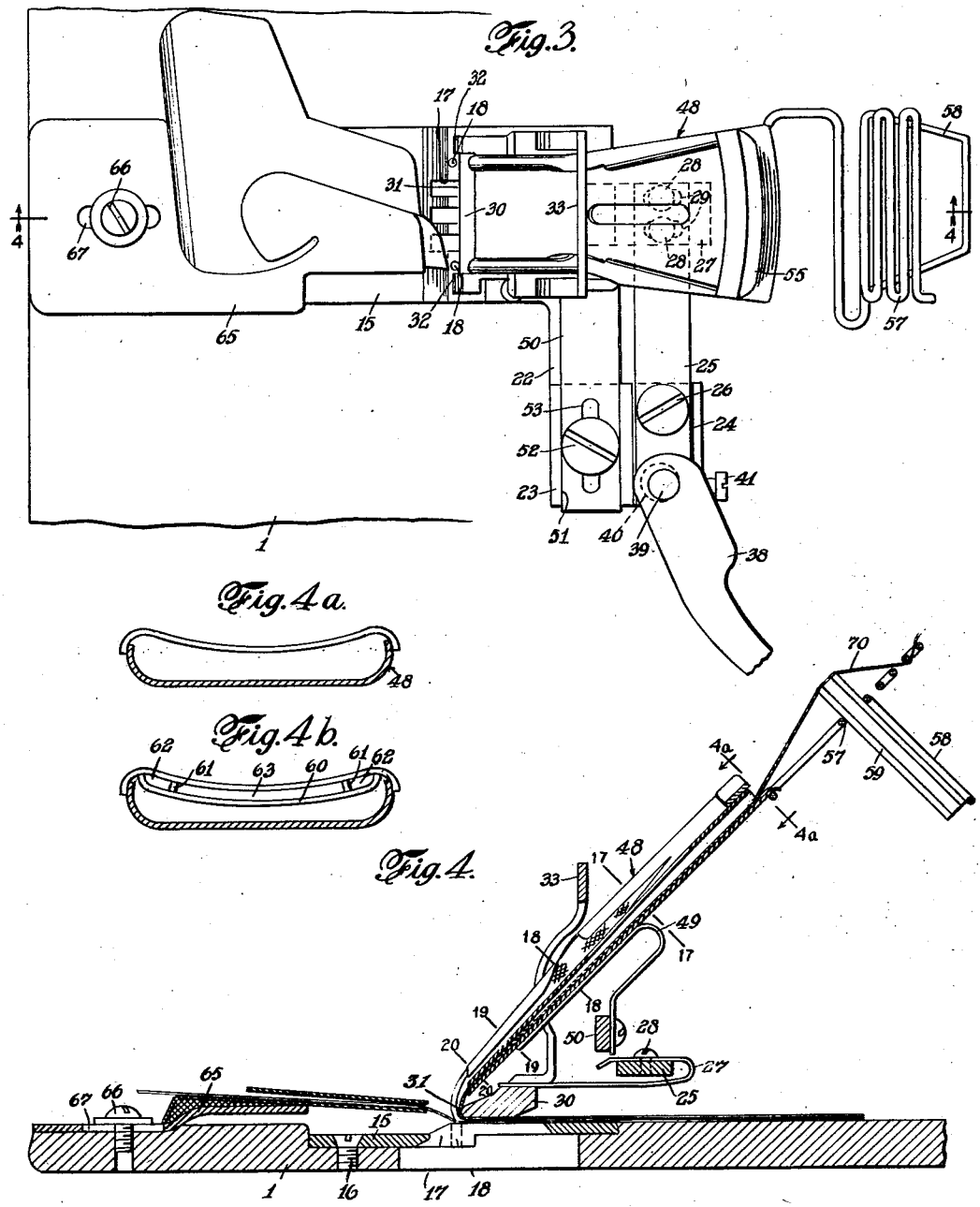

Dec. 24, 1935.  C. SEAMAN  2,025,531
METHOD AND APPARATUS FOR MAKING BLIND STITCHED FACING
Filed July 17, 1935  4 Sheets-Sheet 3
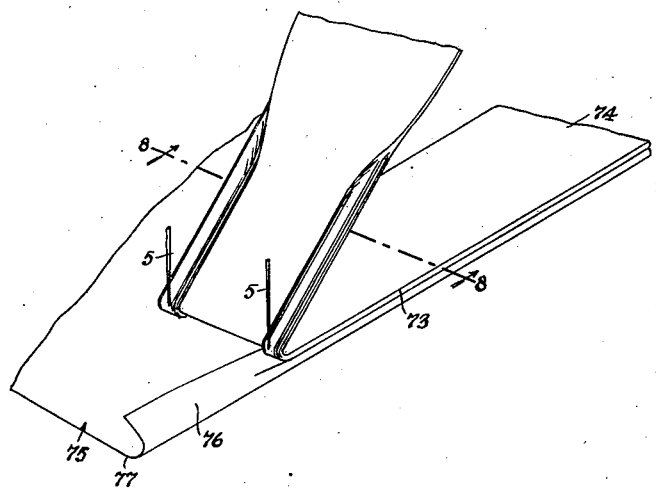
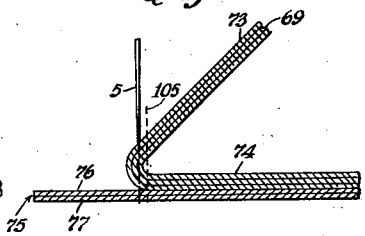
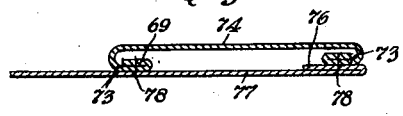
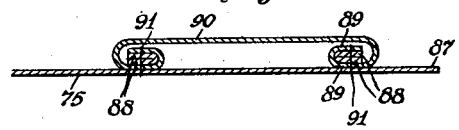
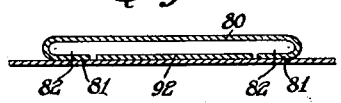
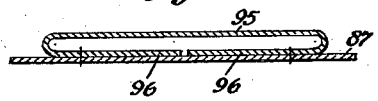
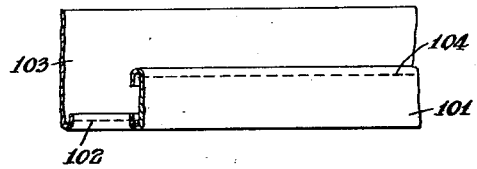
INVENTOR.
Charles Seaman
BY
Wm. S. Pritchard
ATTORNEY.

Dec. 24, 1935.  C. SEAMAN  2,025,531
METHOD AND APPARATUS FOR MAKING BLIND STITCHED FACING
Filed July 17, 1935  4 Sheets-Sheet 4
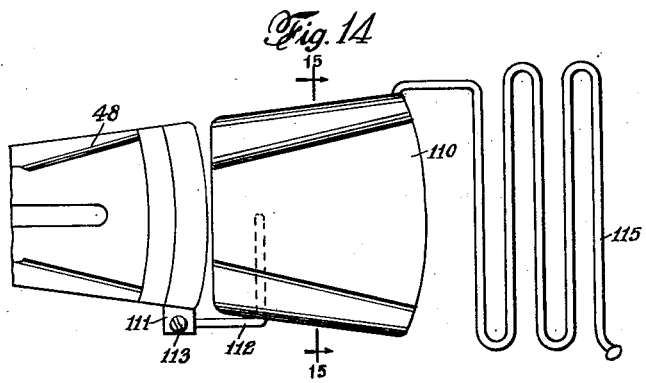
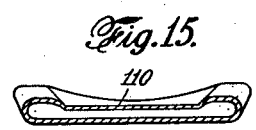
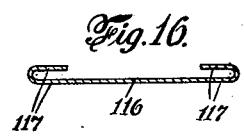
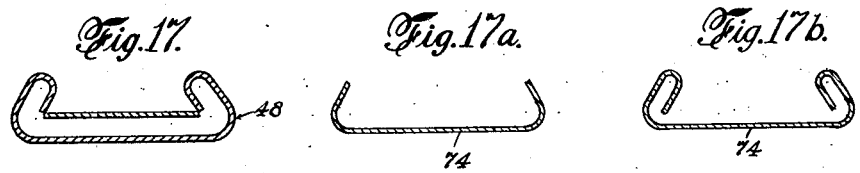
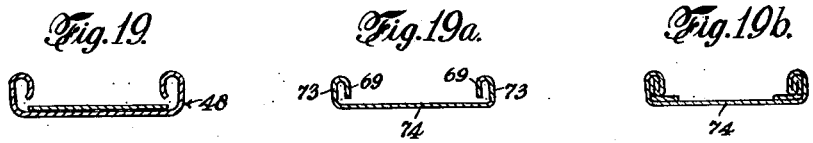
INVENTOR.
Charles Seaman
BY
Wm. S. Pritchard
ATTORNEY.

Patented Dec. 24, 1935

2,025,531

UNITED STATES PATENT OFFICE 2,025,531

METHOD AND APPARATUS FOR MAKING BLIND STITCHED FACING

Charles Seaman, Jamaica Estates, N. Y.

Application July 17, 1935, Serial No. 31,897

21 Claims. (Cl. 112—176)

This invention relates to a method and apparatus for forming and attaching blind stitched facings, such as braid, stripes, trimming and the like.

An object of the invention is to provide a simple, convenient and dependable device of the type above indicated.

Another object is to provide an attachment for the above purpose which is adapted to be applied to a standard sewing machine.

Another object is to provide an attachment having means for accurately adjusting the same with respect to the needles of a multiple-needle sewing machine so as to control the type of stitching effected thereby.

Another object is to provide an attachment which may be used for making various forms of blind stitched facing.

Another object is to provide an attachment of the above type which may be so adjusted as to produce a stitch imitating hand stitching.

Various other objects and advantages will be apparent as the nature of the invention is more fully disclosed.

The broader aspects of the invention will be better understood by referring to the embodiment thereof which is shown in the accompanying drawings and described more in detail hereinafter.

In the drawings,

Figure 1 is an end elevation of a sewing machine showing the attachment in position;

Figure 2 is a front elevation of a portion of the sewing machine showing the attachment;

Figure 3 is a top plan view of the attachment;

Figure 4 is a longitudinal section taken on the line 4—4 of Figure 3 with the feed dogs omitted for clearness;

Figure 4a is an enlarged transverse section taken along the line 4a—4a of Figure 4 showing the mouth of the folder;

Figure 4b is a similar section showing a modification for use with one or more filler strips;

Figure 5 is a diagrammatic view to illustrate the path of the fabric through the machine;

Figure 6 is a sectional view showing the path of the needle through the fabric at the point of stitching;

Figure 7 is a detail view of the mouth of the folder;

Figure 8 is a transverse section of the finished material taken along the line 8—8 of Figure 5;

Figure 9 is a similar section showing a facing having fillers located at the edges thereof so as to increase the thickness of material at the point of stitching;

Figure 10 is a similar section showing a facing having a central filler located therein;

Figure 11 is a similar section showing a central filler formed from the same piece of material as the facing;

Figure 12 is a similar section showing a heading attached to the base material with the facing;

Figure 13 is a broken perspective showing a facing stitched to imitate hand stitching.

Figure 14 is a detail view showing a prefolder in position;

Figure 15 is a section taken along the line 15—15 of Figure 14;

Figure 16 is a section of the fabric as folded by the prefolder of Figure 14;

Figures 17 to 20 inclusive are sections through the folder taken along the lines 17—17 to 20—20 respectively of Figure 4;

Figures 17a to 20a inclusive are sections of the fabric, with the folder removed for clearness, taken along the same lines 17—17 to 20—20 respectively of Figure 4 to illustrate approximately the different stages of the folding operation; and Figures 17b to 20b inclusive are similar sections of a fabric which has been prefolded to provide an extra filler at the edges.

In the following description and in the claims, certain specific terms are used for convenience in referring to various details of the invention. These terms, however, are to be interpreted as broadly as the state of the art will permit.

Referring to the drawings more in detail, the invention is shown as applied to a sewing machine having a base 1 and a head 2 carrying a needle bar 3 to which a header 4 is secured carrying a pair of needles 5. The head 2 also carries a presser-foot bar 6 of the usual construction. Feed dogs 7, extending through an aperture 8 in the base 1 of the machine, are adapted to feed material to the needles 5 for stitching. A hand lever 9 may be provided to elevate the presser-foot bar 6 to permit the material to be adjusted in the machine. Inasmuch as the above-described mechanism is of standard construction, only so much thereof is disclosed as is necessary to an understanding of the present invention.

Referring to Figures 3 and 4, the attachment is shown as comprising a base plate 15 which is adapted to be secured to the base 1 of the machine, as by a screw 16. The base plate 15 is provided with a set of apertures 17 through which the feed dogs 7 may extend, and with a pair of apertures 18 through which the needles 5 pass in stitching. The base plate 15 carries a laterally extending arm 22 to which a block 23 may be secured.

The block 23 may have a channel 24 formed in its top face in which a lever 25 is pivotally secured, as by a screw 26. The lever 25 carries at its free end a spring 27 which may be attached thereto by screws 28 extending through elongated slots 29 in said spring. The spring 27 carries a presser-foot 30 having a front edge 31 about which the material is adapted to feed and a pair of shoulders 32 formed on opposite sides thereof to guide the material over said edge. The presser-foot 30 may carry a bracket 33 which is adapted to engage a screw 34 carried by the presser-foot bar 6 to permit the presser-foot 30 to be elevated from the goods when the presser-foot bar is raised.

The lever 25 may be pivotally adjusted, as by a hand lever 38 having a pivot 39 positioned in the block 23 and provided with an eccentric surface 40 engaging a suitable aperture in the end of the lever 25. A set screw 41 may be used to lock the lever 25 in adjusted position.

It will be noted that the presser-foot 30 may be shifted toward or away from the path of the needles 5 by loosening the screws 28 and adjusting the spring 27 with respect to the lever 25. Angular adjustment of the presser-foot 30 is also obtained by movement of the lever 38, which causes a corresponding movement of the lever 25 about the axis of the screw 26. This angular movement permits the relative positions of the two sides of the presser-foot 30 to be differently adjusted with respect to the paths of the needles. By a combination of the above-mentioned adjustments, the presser-foot may be positioned in any desired relationship to the needles.

A folder 48 may be mounted on a spring bracket 49 carried by a bar 50 which may be seated in a channel 51 formed in the top of the block 23 and may be adjustably secured therein, as by a set screw 52 extending through an elongated aperture 53 in said bar 50. The folder 48 may have an opening 55 (Figures 3, 7 and 4a) adapted to receive the facing material and may have its edges progressively inturned, as illustrated by Figures 17 to 20, so as to roll the edges of the facing material to form a plurality of plies and to discharge the same at a point adjacent the presser-foot 30. The material, passed through the folder 48, is fed downwardly over the edge 31 of the presser-foot 30 and under the presser-foot in engagement with the feed dogs 7 by which the material is progressively fed through the machine. A tensioning gate 57, formed, for example, of a wire bent into the form of reverse folds, may be secured to the folder 48 in a position to feed material to the opening 55 thereof. Said tensioning gate 57 may also have a downwardly extending loop 58 formed therein which is adapted to receive and support a material, such as a block of wax 59, for treatment of the facing material as it is passed to the folder. The wax 59 may be frictionally held in the tensioning gate 57 adjacent the loop 58 in a position such that the facing is caused to pass over the top edge of the wax on its way to the folder 48. This treatment serves to render the material more amenable to the operation of the folder, particularly when comparatively stiff materials are being employed.

In the modified form illustrated in Figure 4b, a guide wire 60 is secured to the folder 48 and extends substantially across the opening 55. A pair of transverse wires 61 may be secured to the guide wire 60 so as to provide a pair of outer spaces 62 and a central space 63. The outer spaces 62 may be used to guide separate strips of filler and to feed the same to the edges of the facing as it is folded, whereby additional thicknesses of material are produced in the various folds. This may be desirable with thin facing, in order to provide a sufficient thickness to permit the blind stitching to take place. The central space 63 may be used to guide a central filler or a gathering tape, elastic or the like, to the facing as it is being attached.

In some instances, it may be desirable to attach the facing to the base material at substantially the edge thereof. A separate folder 65 is accordingly provided which may be attached to the base 1 of the machine, as by a screw 66 extending through an elongated slot 67 in said folder. The folder 65 is adapted to receive the edge of the base material and to fold the same over so as to conceal the raw edge and to discharge the folded edge into the path of one of the needles 5, for example, the right-hand needle, as seen from the front of the machine. The position of this folder may be adjusted in accordance with the requirements of any particular case.

In the operation of this device, a strip of facing material 70 may be fed from a roll 71 which may be supported, for example, on a bracket 72 secured to the head 2 of the sewing machine in any convenient manner, through the tensioning gate 57, thence through the folder 48 wherein the edges of the facing material 70 are progressively rolled as illustrated in Figures 17a to 20a and Figure 8 to form a top ply 74 and a plurality of under plies, such as an outer ply 73 and an inner ply 69. The folded facing material 70 passes from the folder 48 around the edge 31 of the presser-foot 30 and between the presser-foot 30 and feed dogs 7 (Figures 4 and 5). The base material 75 may be fed from the front of the machine through the folder 65, wherein the edge thereof is turned to form an inner ply 76 and an outer ply 77 (Figures 5 and 8).

The presser-foot 30 may be adjusted so that the right-hand needle, on its penetrating stroke, is caused to enter the outer face of the outer ply 73 (Figure 6), to extend through the inner ply 69 but not through the top ply 74, to emerge from the outer face of the under ply 73, and then penetrate the two plies 76 and 77 of the base material 75, to form a stitch 78 (Figure 8) which is concealed by the top ply 74. A similar adjustment is effected of the presser-foot with respect to the left-hand needle so that a similar stitching takes place, with the exception that the inner ply 76 of the base material 75 does not extend past the path of the left-hand needle.

Between successive stitches, the material is fed rearwardly by the feed dogs 7. Hence, a blind stitch is produced and the needles 5, at each operation, cause the facing to be tightly drawn against the base material. Inasmuch as the needle does not penetrate through the top ply 74 of the facing, the stitch 78 is visible only from the back of the base material 75, the facing being blind stitched as seen from the front.

It is obvious that by changing the position of the presser-foot 30 with respect to the needles 5, a greater or lesser number of plies can be penetrated by the needle. This adjustment also permits materials of different thicknesses to be employed. If heavy material is employed, a single under ply may be sufficient to receive the stitching, as shown in Figure 10, wherein the facing 80 is folded at its two edges to form a single under ply 81 through which the stitch 82 extends. In order to fold the facing in this manner, a somewhat narrower facing is used than if the edges are to be folded into the plurality of under plies. The operation is otherwise the same as above described and may be carried out in the same folder, the number of under plies being varied according to the width of the facing material.

In certain instances, as, for example, with thin material, it may be found desirable to include the filler in the folds at the two edges of the facing so as to produce enough body to permit the needle to penetrate the same without penetrating the top ply. For this purpose, a filler 85 may be fed from a roll 86 supported on the bracket 72, through the spaces 62 of the folder 48, and downwardly through the folder with the facing material 70. The filler 85 is then folded into the edges of the facing to produce, for example, two inner plies 88 (Figure 9) which may be located within the under plies 89 of the facing 90. A stitch 91 may extend through the plies 88 and 89 but not through the exposed face of the facing 90.

The filler 85 may be formed integrally with the facing by using a facing sufficiently wide to furnish material for folding at the edges and modifying the folder 48 so as to fold the edges over a plurality of times, whereby the desired thickness is obtained. The edges of the facing may, for example, be prefolded, as by a prefolder 110 of well-known form, positioned ahead of the folder 48, as shown in Figure 14, so that additional plies are produced as the facing passes through the folder 48.

For this purpose, the folder 48 is shown in Figure 14 as provided with an ear 111 in which the prefolder 110 is secured by a wire 112 which enters a recess in the ear 111 and is secured by a set screw 113. The prefolder 110 may be of well-known form adapted to fold over the edges of the fabric as shown in Figure 16. The prefolder 110 is provided with a gate 115 similar to the gate 57 above described. When the prefolder 110 is to be used, the gate 57 is removed from the folder 48 and the prefolder is affixed as shown in Figure 14. Obviously, the gate 57 may be detachably secured to the ear 111, if desired, so as to facilitate changes from the gate to the prefolder as desired.

A facing 116 may be prefolded in the prefolder 110 to form a pair of plies 117 at each edge (Figure 16). It is then passed through the folder 48 wherein the edges are progressively rolled, as illustrated in Figures 17b to 20b, to form extra plies at each edge. In the form shown, five under plies are formed at each edge. It is obvious, however, that this number may be varied by changing the width of the facing material supplied to the prefolder 110.

In certain instances, as, for example, when a comparatively heavy facing is employed, or when a puffed effect is desired, an extra filler 92 (Figure 10) may be inserted under the facing. This filler 92 may be fed from a roll 93 supported on a bracket 94 which may be attached to the bracket 72 in any convenient manner. The filler may be fed through the space 63 of the folder 48 and thence downwardly and around the presser-foot 30 with the facing 70. This filler 92 may comprise, for example, a draw tape or an elastic, which is loosely held under the facing and may be attached simultaneously with the facing. The device accordingly provides a simple and convenient manner of attaching draw strings and elastics while the garment or other article is being made.

It is also possible to modify the operation of the device so as to produce a filler which is integral with the facing itself. Figure 11 illustrates a facing of this type. In this figure, the facing 95 is shown as folded inwardly by an amount such that the two edges of the facing form an integral filler 96. It is obvious that the facing may be folded in this manner by making the same of the proper width and suitably modifying the folder 48.

If the facing is not to be attached at the edge of the base material, the base material may be passed over the folder 65 instead of therethrough and is permitted to extend the required distance beyond the folder and beyond the needle path to form a flap 87 (Figures 9 to 11) of any desired width, which is visible at the side of the facing.

Contrasting effects may be obtained by adjusting the folder 65 laterally with respect to, for example, the right-hand needle 5 so as to cause the folded edge 97 of the base material 75 to extend beyond the facing 98. A heading 99 may be fed in between the facing 98 and the base material 75 in the path of the left-hand needle 5. This heading 99 may extend beyond the facing 98 and may have a certain contrast with the facing 98 and with the base material 75. The stitch 100 may be caused to extend through the heading and through the base material for attaching all these elements in a single operation.

From the above it is evident that various modified types of facing may be attached in the above-described apparatus by making simple variations in the adjustments of the attachment and of the material which is fed therethrough for stitching. It is also obvious that the invention is applicable to machines of the multiple-needle type having more than two needles, adapted, for example, for simultaneously attaching a plurality of facings.

In the above forms, the facing is shown as blind stitched on both edges. It is possible to so adjust the attachment as to produce blind stitching on one edge of the facing and to produce on the other edge a stitch resembling hand stitching. A facing of this type is illustrated in Figure 13 as comprising a facing 101 which is rolled on both edges. One edge is blind stitched, as by a stitch 102, to the edge of a base material 103. The other edge of the facing may have the stitch 104 which is visible from the front thereof and resembles hand stitching. For this purpose, the attachment is so adjusted that one of the needles, for example, the right-hand needle, makes a blind stitch in the manner above indicated. The other needle, that is, the left-hand needle, may be caused to penetrate all of the plies of the facing so as to make a stitch which is visible on the front surface thereof. The needle may, for example, on its penetrating stroke, enter the outer ply 73, extend through the inner ply 69 and through the top ply 74, thence out through the top ply 74, the inner ply 69 and the outer ply 73, as indicated by the dotted line 105 in Figure 6.

This may be effected by angularly adjusting the presser-foot 30 with respect to the needles 5, as by means of the lever 25 and the set screws 28. The stitch 104 which is thus produced differs from ordinary machine stitching in that the thread is visible only in spaced intervals, the length of the visible stitching depending upon the position of the presser-foot and the amount that the needle penetrates the outer surface. If the needle is caused to barely penetrate the outer surface, a narrow stitch will be produced. If the presser-foot is further advanced and the needle is caused to penetrate the outer surface a greater amount, a longer stitch will be produced. In any event, the stitches will be separated in a manner similar to hand stitching.

It is evident that the above-described attachment is capable of varied uses for producing facings having different characteristics. Certain embodiments have been shown for purposes of illustration only. Various changes and modifications may be made therein by a person skilled in the art. The invention is to be limited only in accordance with the following claims when interpreted in view of the prior art.

I claim:

1. In a sewing machine adapted to produce blind stitched facing, a pair of spaced needles operating in unison, a presser-foot having an edge lying closely adjacent the path of travel of said needles, a folder designed to fold the edges of a facing material to form a top ply and an under ply at each longitudinal edge thereof, means to feed the same around said edge of said presser-foot in a path permitting each needle on its penetrating stroke, to enter and emerge from the lower surface of the respective under ply without penetrating the top ply, whereby both edges of the facing are blind stitched.

2. In a sewing machine adapted to produce blind stitched facing, a pair of spaced needles operating in unison, a presser-foot having an edge lying closely adjacent the path of travel of said needles, a folder designed to fold the edges of a facing material to form a top ply and an under ply at each longitudinal edge thereof, means to feed the same around said edge of said presser-foot in a path permitting each needle on its penetrating stroke, to enter and emerge from the lower surface of the respective under ply without penetrating the top ply, whereby both edges of the facing are blind stitched, and means feeding a base material to the needles under the facing whereby the needles, after emerging from said under plies, penetrate the base material for stitching the facing thereto.

3. In a sewing machine adapted to produce blind stitched facing, a plurality of needles operating in unison, a presser-foot having an edge lying closely adjacent the path of travel of said needles, a folder designed to fold each longitudinal edge of a facing material to form a top ply having an inner ply and an outer ply folded thereagainst at the respective edge, means to feed the same around said edge of said presser-foot in a path permitting each needle, on its penetrating stroke, to enter and emerge from the lower surface of the respective outer ply and penetrate the inner ply but not the top ply, whereby the facing is blind stitched at both edges.

4. In a sewing machine adapted to produce blind stitched facing, a plurality of needles operating in unison, a presser-foot having an edge lying closely adjacent the path of travel of said needles, a folder designed to fold each longitudinal edge of a facing material to form a top ply having an inner ply and an outer ply folded thereagainst at the respective edge, means to feed the same around said edge of said presser-foot in a path permitting each needle, on its penetrating stroke, to enter and emerge from the lower surface of the respective outer ply and penetrate the inner ply but not the top ply, whereby the facing is blind stitched at both edges, and means feeding a base material to the needles under the facing whereby the needles, after emerging from said under plies, penetrate the base material for stitching the facing thereto.

5. In a sewing machine adapted to produce blind stitched facing, a pair of spaced needles operating in unison, a presser-foot having an edge lying closely adjacent the path of travel of said needles, a folder designed to fold each longitudinal edge of a facing material to form a top ply and an under ply at the respective edge thereof, means to feed the same around said edge of said presser-foot in a path permitting each needle, on its penetrating stroke, to enter and emerge from the lower surface of the respective under ply so as to stitch each edge of the facing with a blind stitch, a second folder adapted to fold an edge of a base material, and means feeding said base material under the facing in a position to permit one of the needles to penetrate the folded edge whereby the facing is attached to the base material adjacent the folded edge thereof.

6. A sewing machine adapted for the formation of blind stitched facing, said machine having a plurality of needles operating in unison, a presser-foot having an edge lying closely adjacent the path of travel of said needles, means for folding the edges of a facing material to form a top ply and an under ply at each longitudinal edge thereof, means for passing the material thus folded around said edge of and under said presser-foot with said top ply toward the presser-foot, and means for folding the edge of a base material and feeding the same under said presser-foot and under said facing, the edge of said presser-foot being positioned with relation to the path of travel of said needles to permit each of said needles, on its penetrating stroke, to enter and emerge from the under surface of the respective under ply of said facing material without penetrating the top ply, and then to penetrate both plies of the base material, thereby blind stitching the facing to the base material.

7. A sewing machine adapted for the formation of blind stitched facing, said machine having a pair of needles operating in unison, a presser-foot having an edge lying closely adjacent the path of travel of said needles, means for folding the edges of the facing material to form a top ply and an under ply at each longitudinal edge thereof, and means for passing the material thus folded around said edge of and under said presser-foot, the edge of said presser-foot being positioned with relation to the path of travel of said needles to permit one of said needles to enter and emerge from the under surface of the under ply of said material without penetrating the top ply and to permit the other needle, on its penetrating stroke, to enter the under surface of the under ply to penetrate the top ply, then emerge through the top ply and under ply, thereby obtaining a facing blind stitched on one side and having spaced visible stitches on the other side.

8. An attachment for a multiple-needle sewing machine, comprising a presser-foot having an edge to be positioned closely adjacent the path of travel of the needles of said machine, a folder adapted to fold each longitudinal edge of a facing to form one or more under plies at the respective edges, and means to feed the same around said edge of said presser-foot, said presser-foot to be positioned to permit each needle, on its penetrating stroke, to enter and emerge from the respective under ply without penetrating the outer surface of the facing so as to produce a blind stitch.

9. An attachment for a multiple-needle sewing machine, comprising a presser-foot having an edge to be positioned closely adjacent the path of travel of the needles of said machine, a folder designed to fold each longitudinal edge of a facing to form one or more under plies at the respective edges, means to feed the same around said edge of said presser-foot, said presser-foot to be positioned to permit each needle on its penetrating stroke, to enter and emerge from the respective under ply without penetrating the outer surface of the facing so as to produce a blind stitch, and a second folder adapted to fold the edge of a base material and to feed the same under said presser-foot in a position to permit one of the needles to penetrate said last folded edge for stitching one edge of the facing thereto.

10. An attachment for a multiple-needle sewing machine, comprising a presser-foot having an edge to be positioned closely adjacent the path of travel of the needles of said machine, a folder designed to fold each longitudinal edge of a facing to form a top ply and an under ply at the respective edges, and means to feed the same around said edge of said presser-foot with the top ply toward the presser-foot to present the respective under ply to each needle for stitching from the under side of the respective under ply, whereby each needle on its penetrating stroke will enter and emerge from said under side of the under ply.

11. An attachment for a multiple-needle sewing machine, comprising a plate to be secured to the base plate of the machine and having apertures through which the needles of the machine are adapted to pass, a presser-foot having an elongated edge located closely adjacent the path of travel of each of said needles, and a pivoted lever carrying said presser-foot, said lever being adapted to effect angular adjustment of said presser-foot with respect to the different needles for obtaining the desired stitching effect.

12. An attachment for a multiple-needle sewing machine, comprising a plate adapted to be secured to the base plate of the sewing machine and having apertures through which the needles of the machine are adapted to pass, a presser-foot having an edge located closely adjacent the path of travel of each of said needles, spring means supporting said presser-foot, a pivoted lever carrying said spring means, said lever being adapted to effect angular adjustment of said presser-foot with respect to the different needles, and means for adjusting said spring means with respect to said pivoted lever.

13. An attachment for a multiple-needle sewing machine, comprising a plate adapted to be secured to the base plate of the machine and having apertures through which the needles of the machine are adapted to pass, a presser-foot having an elongated edge located closely adjacent the path of travel of each of said needles, a pivoted lever carrying said presser-foot, said lever being adapted to effect angular adjustment of said presser-foot with respect to the different needles for obtaining the desired stitching effect, and a folder adapted to fold the edges of a facing material to form a top ply with one or more under plies at the edges thereof, said folder being positioned to pass the folded facing around the edge of said presser-foot in a position to receive a stitch entering and emerging from the under surface of the under ply.

14. An attachment for a multiple needle sewing machine, comprising a presser-foot having an edge adapted to be positioned closely adjacent the path of travel of the needles of said machine, a folder and a prefolder, said prefolder designed to fold over each longitudinal edge of a fabric to form a pair of plies at each edge, said folder being adapted to receive the fabric from said prefolder and to fold over the edges to form superposed plies at each edge, said folder being positioned to direct the folded fabric around the edge of said presser-foot in a position to present the under side of the respective under ply to permit each needle to enter and emerge in its penetrating stroke from the said under side of the said under ply.

15. An attachment for a multiple needle sewing machine, comprising a presser-foot having an edge to be positioned closely adjacent the path of travel of the needles of said machine, means to infold the edges of a fabric to form a double ply at each edge, means to fold said double plies to form at least four under plies at each edge, and means to direct the folded fabric around the edge of said presser-foot in a position to present the under plies to the needles for blind stitching from the under side of the under plies.

16. An attachment for a multiple needle sewing machine, comprising a presser-foot having an edge adapted to be positioned closely adjacent the path of travel of the needles of said machine, means to fold over the edges of a fabric to form one or more under plies, means to position a filler between certain of said plies, and means to direct the folded fabric around the edge of said presser-foot in a position to present the under plies to the needles for blind stitching from the under side of the under plies.

17. The method of forming a blind stitched facing which comprises folding the edges of a facing to form one or more under plies, bending the folded facing transversely, progressively feeding the same, and stitching through the under plies of each edge at said bend, each stitch entering and emerging from the under surface of the under ply without penetrating the outer surface of the facing.

18. The method of forming a blind stitched facing which comprises folding the edges of a facing to form one or more under plies, guiding a filler into the fold at each of said edges, bending the folded facing transversely, progressively feeding the same, and stitching through the under plies of each edge at said bend, each stitch entering and emerging from the under surface of the under ply without penetrating the outer surface of the facing.

19. The method of forming a blind stitched facing which comprises folding the edges of a facing to form one or more under plies, guiding a filler into the space between the edge folds, bending the folded facing transversely, progressively feeding the same, and stitching through the under plies of each edge at said bend, each stitch entering and emerging from the under surface of the under ply without penetrating the outer surface of the facing.

20. An attachment for a sewing machine comprising a presser foot having an edge to be positioned closely adjacent the path of travel of the stitching means of said machine, a folder designed to fold each longitudinal edge of a facing to form an edge fold having a top ply and an under ply at the respective edges, means to feed the same around said edge of said presser foot with the top ply toward the presser foot to present the respective under ply to the stitching means for stitching each folded edge from the under side of the respective under ply, whereby the stitching means in its penetrating stroke adjacent each edge will enter and emerge from the respective under side of the respective under ply without penetrating the outer surface of the facing so as to produce a blind stitch.

21. In a sewing machine adapted to produce blind stitched facing, stitching means, a presser foot having an edge to be positioned closely adjacent the path of travel of the stitching means of said machine, a folder designed to fold each longitudinal edge of a facing to form an edge fold having a top ply and an under ply at the respective edges, means to feed the same around said edge of said presser foot with the top ply toward the presser foot to present the respective under ply to the stitching means for stitching each folded edge from the under side of the respective under ply, whereby the stitching means in its penetrating stroke adjacent each edge will enter and emerge from the respective under side of the respective under ply without penetrating the outer surface of the facing so as to produce a blind stitch.

CHARLES SEAMAN.